(12) United States Patent
Triarsi et al.

(10) Patent No.: US 10,973,376 B2
(45) Date of Patent: *Apr. 13, 2021

(54) PAPER SHEETS HAVING MOIST CENTER SECTIONS IMPREGNATED WITH LIQUIDS AND DRY OUTER SECTIONS BOUNDING THE MOIST CENTER SECTIONS

(71) Applicants: Gehane Triarsi, Mountainside, NJ (US); Shaun Heusen, Cranford, NJ (US)

(72) Inventors: Gehane Triarsi, Mountainside, NJ (US); Shaun Heusen, Cranford, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,150

(22) Filed: Feb. 26, 2020

(65) Prior Publication Data
US 2020/0187726 A1  Jun. 18, 2020

Related U.S. Application Data

(63) Continuation of application No. 14/506,870, filed on Oct. 6, 2014, now Pat. No. 10,602,885.

(60) Provisional application No. 61/887,707, filed on Oct. 7, 2013.

(51) Int. Cl.
*A47K 10/16* (2006.01)
*A47K 10/32* (2006.01)
*B32B 3/10* (2006.01)
*B32B 29/00* (2006.01)

(52) U.S. Cl.
CPC ........ *A47K 10/16* (2013.01); *A47K 2010/322* (2013.01); *A47K 2010/3266* (2013.01); *B32B 3/10* (2013.01); *B32B 29/00* (2013.01)

(58) Field of Classification Search
CPC .......... A47K 2010/3266; A47K 8/0208; A47K 10/16–24; B32B 3/10; B32B 29/00
See application file for complete search history.

(56) References Cited

U.S. PATENT DOCUMENTS

| | | |
|---|---|---|
| 3,921,802 A | 11/1975 | Thompson |
| 4,106,617 A | 8/1978 | Boone |
| 4,515,703 A | 5/1985 | Haq |
| 4,600,620 A | 7/1986 | Lloyd et al. |
| 4,816,320 A | 3/1989 | St. Cyr |

(Continued)

*Primary Examiner* — Jennifer A Gillett
(74) *Attorney, Agent, or Firm* — Doherty IP Law Group LLC

(57) ABSTRACT

A paper product has a plurality of individual paper sheets with a moist center section impregnated with a liquid and dry outer sections that bound the moist center section. The paper product includes a core element and the plurality of individual paper sheets that are wound around the core element. Each paper sheet has a top surface, a bottom surface, the moist center section impregnated with the liquid, a first dry outer section bounding a first edge of the moist center section, a second dry outer section bounding a second edge of the moist center section, a first moisture impermeable barrier at the first edge of the moist center section, a second moisture impermeable barrier at the second edge of the moist center section, and a water impermeable membrane extending laterally between the first and second moisture impermeable barriers for dividing the moist center section into a first region and a second region.

20 Claims, 5 Drawing Sheets

(56) References Cited

U.S. PATENT DOCUMENTS

| | | |
|---|---|---|
| 4,878,775 A | 11/1989 | Norbury et al. |
| 5,242,433 A | 9/1993 | Smith et al. |
| 5,509,593 A | 4/1996 | Bloch et al. |
| 6,085,899 A | 7/2000 | Thorsbakken |
| 6,121,165 A | 9/2000 | Mackey et al. |
| 6,170,426 B1 | 1/2001 | Thorsbakken |
| 6,346,153 B1 | 2/2002 | Lake et al. |
| 7,059,493 B2 | 6/2006 | Welchel et al. |
| 7,380,687 B2 | 6/2008 | FitzSimons et al. |
| 7,517,582 B2 | 4/2009 | Amundson et al. |
| D596,409 S | 7/2009 | Santisteban |
| 7,775,350 B2 | 8/2010 | Palamountain |
| 8,097,322 B1 | 1/2012 | Osorio |
| 8,444,007 B2 | 5/2013 | Hatter et al. |
| 10,602,885 B2 | 3/2020 | Triarsi et al. |
| 2003/0084914 A1 | 5/2003 | Simon |
| 2004/0120988 A1 | 6/2004 | Masting |
| 2007/0196602 A1 | 8/2007 | Kim et al. |
| 2010/0009145 A1* | 1/2010 | Mueller ................ A61F 13/551 428/213 |
| 2011/0027329 A1 | 2/2011 | Guo |
| 2013/0075416 A1 | 3/2013 | Boyce |

* cited by examiner

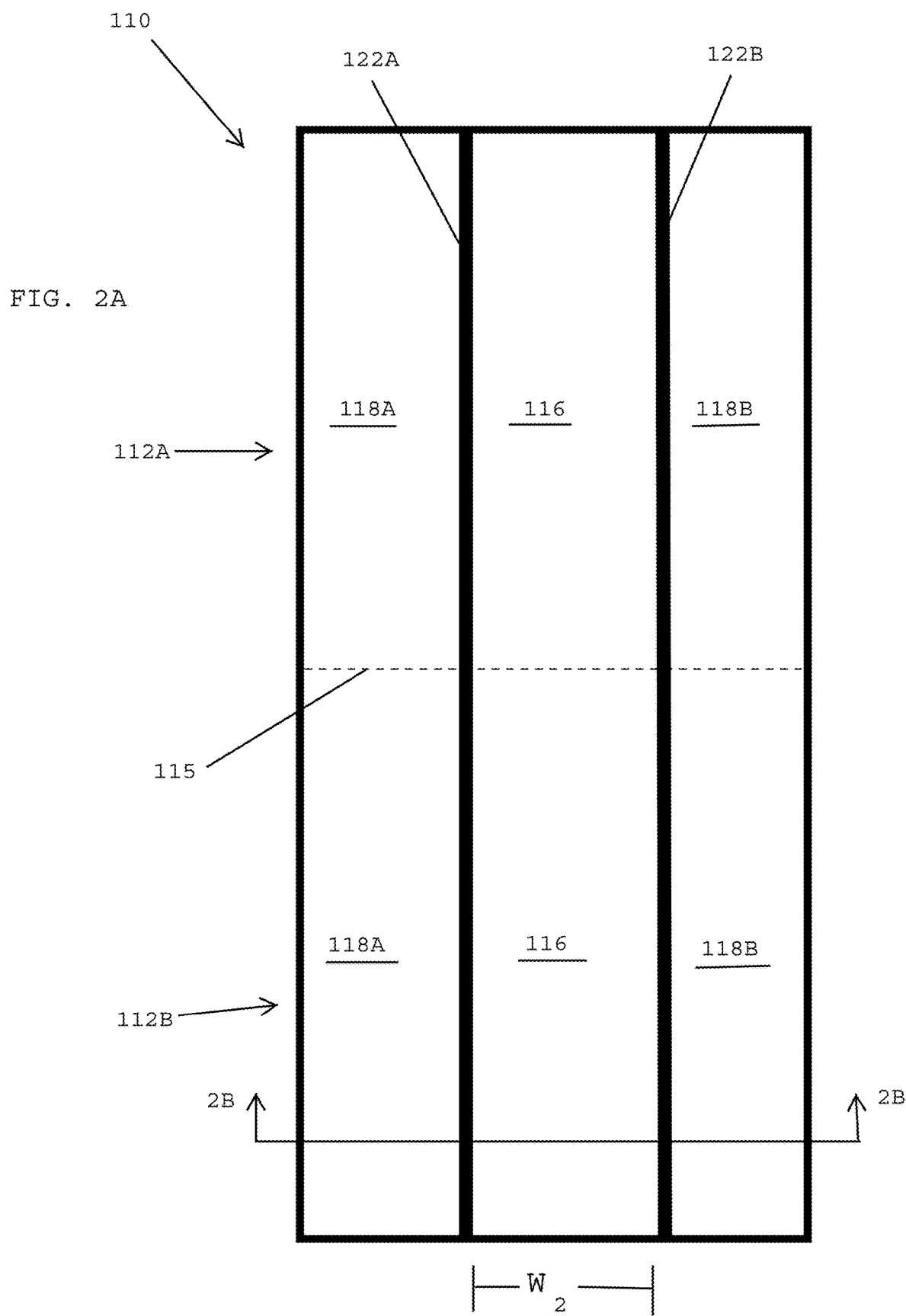

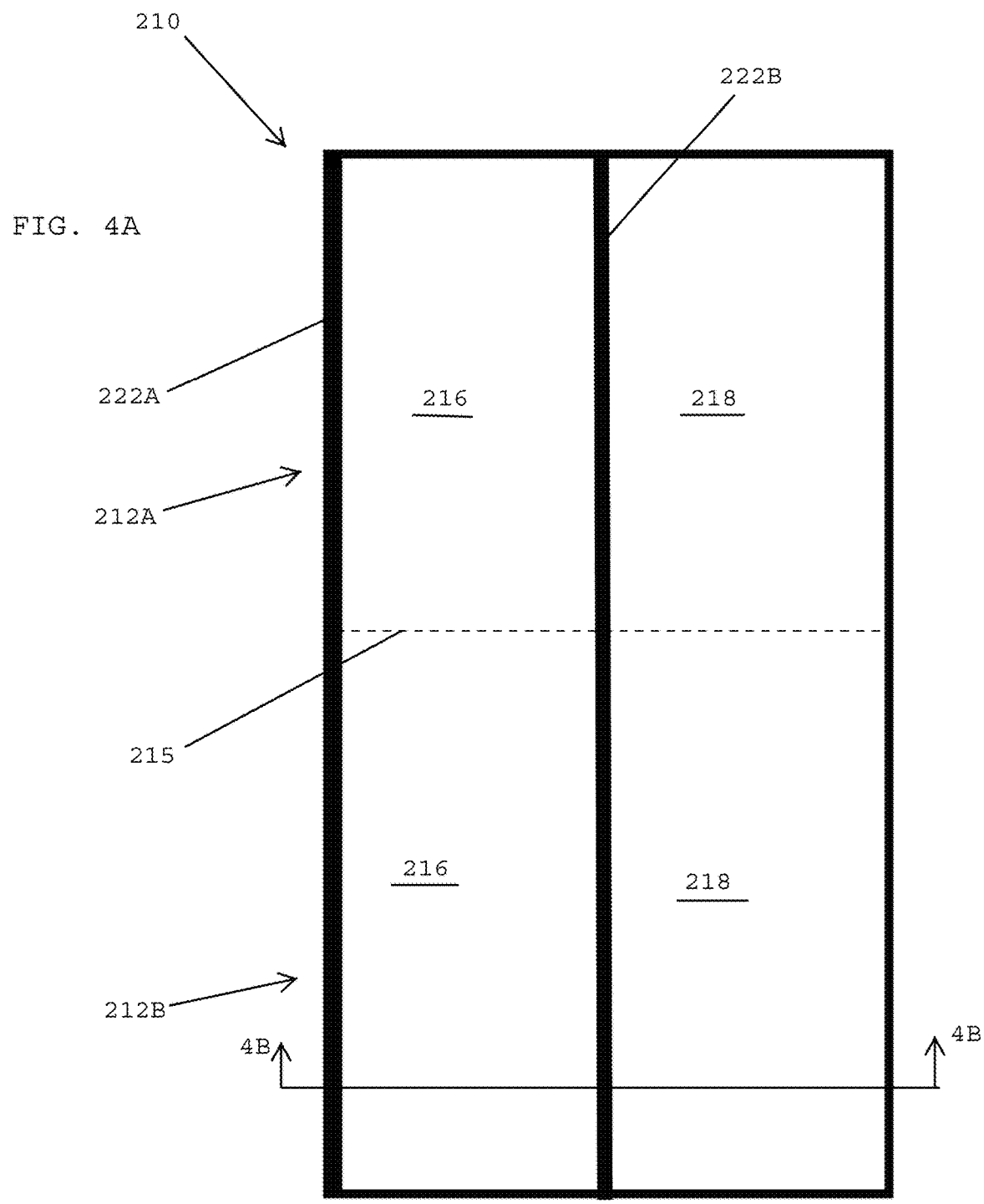
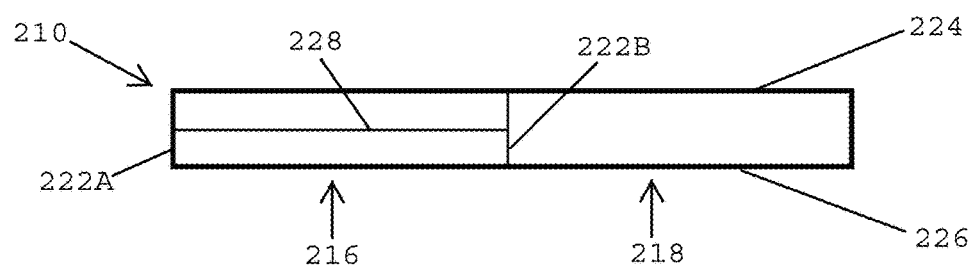

PAPER SHEETS HAVING MOIST CENTER SECTIONS IMPREGNATED WITH LIQUIDS AND DRY OUTER SECTIONS BOUNDING THE MOIST CENTER SECTIONS

CROSS-REFERENCE TO RELATED APPLICATIONS

The present patent application claims priority to U.S. patent application Ser. No. 14/506,870, filed on Oct. 10, 2014, which, in turn, claims benefit of U.S. Provisional Application Ser. No. 61/887,707, filed Oct. 7, 2013, the disclosures of which are hereby incorporated by reference herein.

BACKGROUND OF THE INVENTION

Field of the Invention

The present application is generally related to paper products and is more specifically related to paper products that are impregnated with liquids to provide individual sheets having moist sections and dry sections.

Description of the Related Art

Dispensers containing wet or pre-moistened sheets have a wide variety of uses including personal hygiene (e.g., baby wipes), cleaning surfaces (e.g., kitchen surfaces), and sanitizing tools (e.g., medical devices). Such dispensers are designed to maintain the moisture content of the wet sheets while allowing individual wet sheets to be conveniently dispensed. The wet or pre-moistened sheets provide a cleaning and sanitizing capability not provided by dry towels, however, there is often a need to use dry towels together with wet towels. For example, dry towels may be used to dry a surface after the surface has been cleaned with a wet towel. To satisfy this need, dispensers have been designed to hold and dispense both wet and dry towels.

For example, U.S. Pat. No. 7,380,687 to Fitzsimons discloses a wet and dry towel dispenser that contains and dispenses both wet and dry towels. The dispenser includes coaxially located compartments for containing the wet towels and the dry towels, in a nested arrangement, to use space efficiently within the dispenser. In one embodiment, the dispenser has a substantially cylindrical shape and a removable cover on one end to allow the towels to be loaded into the respective compartments.

There have been other developments directed to combining wet and dry wipes. U.S. Pat. No. 5,509,593 to Bloch discloses a dispenser that combines dry sanitary tissue and pre-wetted personal hygiene wipes. The dispenser has front and rear housings that form a first compartment for a roll of dry sanitary tissue. A second compartment is provided inside the first compartment from which a roll of pre-wetted personal hygiene wipes is dispensed.

U.S. Pat. No. 3,921,802 to Thompson discloses toilet tissue formed of a continuous strip having moist and dry tissue sheets in alternating sequence. Adjacent moist and dry tissue sheets are separated by perforations forming tear lines. Each moist tissue sheet includes a moist pad adhered to one side thereof by an adhesive substance forming a moisture resistant barrier between the tissue and the moist pad. A removable moisture resistant cover sheet covers the moist pad and is adhered to the moist tissue sheet about the periphery of the moist pad. A holding tab is secured to the side of the moist tissue sheet opposite the moist pad. The moist pad is exposed by grasping the holding tab and removing the cover sheet from the moist tissue sheet. In one embodiment, the toilet tissue is packaged on a tubular roll. In another embodiment, the toilet tissue is packaged in accordion-type folds within a substantially rectangular dispensing container.

U.S. Pat. Nos. 6,085,899 and 6,170,426 to Thorsbakken discloses a tissue dispenser for dispensing either dry or partially wet and partially dry segments of tissues. The tissue dispenser has a housing with a tissue egress passage, a tissue source of a predetermined quantity of dry tissue located in the housing, a fluid source of a predetermined volume of fluid located in the housing, and an actuatable application mechanism in fluid communication with the fluid source and operationally positioned proximate to the tissue egress passage. The application mechanism can be actuated to dispense fluid onto the tissue as the tissue passes through the tissue egress passage. One partially wet and partially dry tissue can be used to clean and dry an article. If the application mechanism is not actuated, the dispenser will dispense dry tissues.

U.S. Pat. No. 6,121,165 to Mackey et al. discloses wet-like cleansing articles that are dry to the touch prior to use, but deliver liquid when subjected to in-use shear and compressive forces. In one embodiment, the articles include a carrier and an emulsion applied to the carrier, the emulsion having a continuous external non-polar phase and an internal polar phase dispersed in the external non-polar phase so that the article is capable of retaining fluid prior to use.

U.S. Pat. No. 6,346,153 to Lake discloses a dispenser for a flexible web that can provide a dry web or a liquid treated web. The liquid treatment can include an antimicrobial liquid treatment suitable for personal contact, a cleaner, a soothing lotion, a protective coating, a pharmaceutical treatment, or any other liquid that can provide a beneficial property to a skin surface. The dispenser operates by having a first position from which it provides a dry web, and a second position which contacts the web with a liquid treatment producing a web containing the liquid treatment composition. The user can interact with the dispenser and place the dispenser in the second position or the first position depending on the need for either a wet or dry web.

In spite of the above advances, there remains a need for improved systems, devices and methods for providing paper products having individual sheets or wipes having at least one moist section and one dry section on the same sheet. There also remains a need for paper products having moisture barriers that are able to effectively separate the moist sections from the dry sections and that retain the moisture within the moist sections of the individual sheets during storage and when not in use.

SUMMARY OF THE INVENTION

In one embodiment of the present invention, paper products are impregnated with a liquid, such as a cleaning solution, to provide individual paper sheets having at least one wet or moistened section and at least one dry section. The paper products may be used for various applications including but not limited to cleaning surfaces, personal hygiene, sanitizing instruments, and/or providing medical treatments. In one embodiment, the paper products may have moistened sections that contain various forms of cleaning agents, disinfectants, antiseptics, perfumes, colognes, medical solutions, and/or combinations thereof.

In one embodiment, a moisture impermeable material is utilized for separating moistened sections of a paper product from dry sections of the paper product. In one embodiment, the moisture impermeable material includes a wax material that is deposited on the paper to form a moisture impermeable or water-proof barrier between moist or wet sections and dry sections of the paper product. In one embodiment, the paper product is a paper roll and the moisture impermeable barrier permeates through every layer of the paper roll to form a seal from one layer to the next. During storage and non-use, the barrier material forms a seal that retains the moisture of the moist or wet sections of the paper product. In one embodiment, a user may pull on an end of the paper roll to separate the layers of paper for exposing the moistened sections of the paper roll for use in various applications as needed.

In one embodiment, a paper product has a plurality of individual paper sheets with a moist center section and dry outer sections comprising. The paper product includes a core element and a plurality of individual paper sheets wound around the core element. Each individual paper sheet has a top surface, a bottom surface, a moist center section containing a liquid, a first dry outer section bounding a first edge of the moist center section, a second dry outer section bounding a second edge of the moist center section, a first moisture impermeable barrier at the first edge of the moist center section that divides the moist center section from the first dry outer section, a second moisture impermeable barrier at the second edge of the moist center section that divides the moist center section from the second dry outer section, and a water impermeable membrane extending laterally from the first moisture impermeable barrier to the second moisture impermeable barrier and between the top and bottom surfaces of the individual paper sheet for dividing the moist center section into a first region that extends from the water impermeable membrane to the top surface of the individual paper sheet and a second region that extends from the water impermeable membrane to the bottom surface of the individual paper sheet.

In one embodiment, the first and second moisture impermeable barriers extend continuously over each of the paper sheets wound around the core element. The water impermeable membranes preferably extend through each of the paper sheets between the top and bottom surfaces of the paper sheets.

In one embodiment, the plurality of paper sheets wound around the core element form a plurality of layers, whereby the moist center sections of the paper sheets are aligned with one another on the core element.

In one embodiment, the core element is a cardboard roll having a center section that is aligned with the moist center sections of the paper sheets wound around the cardboard roll, and first and second outer sections that are aligned with the first and second dry outer sections of the paper sheets wound around the cardboard roll. The center section of the cardboard roll is desirably covered by a moisture impermeable barrier to present evaporation of the liquid contained within the moist center sections.

In one embodiment, the first and second moisture impermeable barriers on the paper sheets may be made of wax and/or nano particles. The water impermeable membranes extending through the paper sheets may be made of natural biodegradable materials, synthetic biodegradable materials, soy, and/or albumin protein films.

In one embodiment, the liquid contained within the moist center section of each paper sheet may be liquid solutions, moisturizers, cleaning solutions, antiseptics, medicated solutions, alcohol, liquid soap, baby wipes solutions and/or cleaning wipes solution.

In one embodiment, a paper product having a plurality of individual paper sheets with a moist section and at least one dry section includes a core element, and a plurality of individual paper sheets wound around the core element. Each individual paper sheet has a top surface, a bottom surface, a first edge, a second edge, a moist section containing a liquid, a dry section bounding the first edge of the moist section, a first moisture impermeable barrier at the first edge of the moist section that divides the moist section from the dry section, a second moisture impermeable barrier at the second edge of the moist section, and a water impermeable membrane extending laterally from the first moisture impermeable barrier to the second moisture impermeable barrier and between the top and bottom surfaces of the individual paper sheet for dividing the moist section of the paper sheet into a first region that extends from the water impermeable membrane to the top surface of the paper sheet and a second region that extends from the water impermeable membrane to the bottom surface of the paper sheet.

In one embodiment, the first and second moisture impermeable barriers extend continuously over each of the paper sheets wound around the core element. The water impermeable membranes preferably extend through each of the paper sheets between the top and bottom surfaces of the paper sheets.

In one embodiment, the core element desirably includes a cardboard roll having a first section that is aligned with the moist sections of the paper sheets wound around the cardboard roll, and a second section that is aligned with the dry sections of the paper sheets wound around the cardboard roll. The first section of the cardboard roll is preferably covered by a moisture impermeable barrier.

In one embodiment, a paper product having a plurality of individual paper sheets with a moist center section and dry outer sections includes a cardboard roll having a center section and two outer sections, whereby the center section is covered by a moisture impermeable barrier, and a plurality of individual paper sheets wound around the cardboard roll. In one embodiment, each individual paper sheet preferably has a top surface, a bottom surface, a moist center section containing a liquid, a first dry outer section bounding a first edge of the moist center section, a second dry outer section bounding a second edge of the moist center section, a first moisture impermeable barrier at the first edge of the moist center section that divides the moist center section from the first dry outer section, a second moisture impermeable barrier at the second edge of the moist center section that divides the moist center section from the second dry outer section, and a water impermeable membrane extending laterally from the first moisture impermeable barrier to the second moisture impermeable barrier and between the top and bottom surfaces of the individual paper sheet for dividing the moist center section into a first region that extends from the water impermeable membrane to the top surface of the individual paper sheet and a second region that extends from the water impermeable membrane to the bottom surface of the individual paper sheet.

In one embodiment, the center section of the cardboard roll is preferably aligned with the moist center sections of the paper sheets wound around the cardboard roll, and the first and second outer sections of the cardboard roll are aligned with the first and second dry outer sections of the paper sheets wound around the cardboard roll.

In one embodiment, the water impermeable membrane of the outer-most paper sheet wound around the cardboard roll prevents the liquid contained in the moist center sections from evaporating into the ambient air surrounding the paper product.

In one embodiment, the moisture impermeable barrier on the cardboard roll prevents the liquid contained in the moist center sections of the paper sheets from evaporating into the ambient air through the cardboard roll.

These and other preferred embodiments of the present invention will be described in more detail below.

BRIEF DESCRIPTION OF THE DRAWINGS

FIG. 2A shows a top plan view of a paper product having sheets with moist center sections and two dry outer sections with a moisture impermeable barrier separating the center sections from the two dry outer sections, in accordance with one embodiment of the present invention.

FIG. 4A shows a top plan view of a paper product having sheets with a moist section and a dry section separated by a moisture impermeable barrier, in accordance with one embodiment of the present invention.

FIG. 4B shows a cross-section of the paper product shown in FIG. 4A taken along line 4B-4B of FIG. 4A.

DETAILED DESCRIPTION

Figure 1:
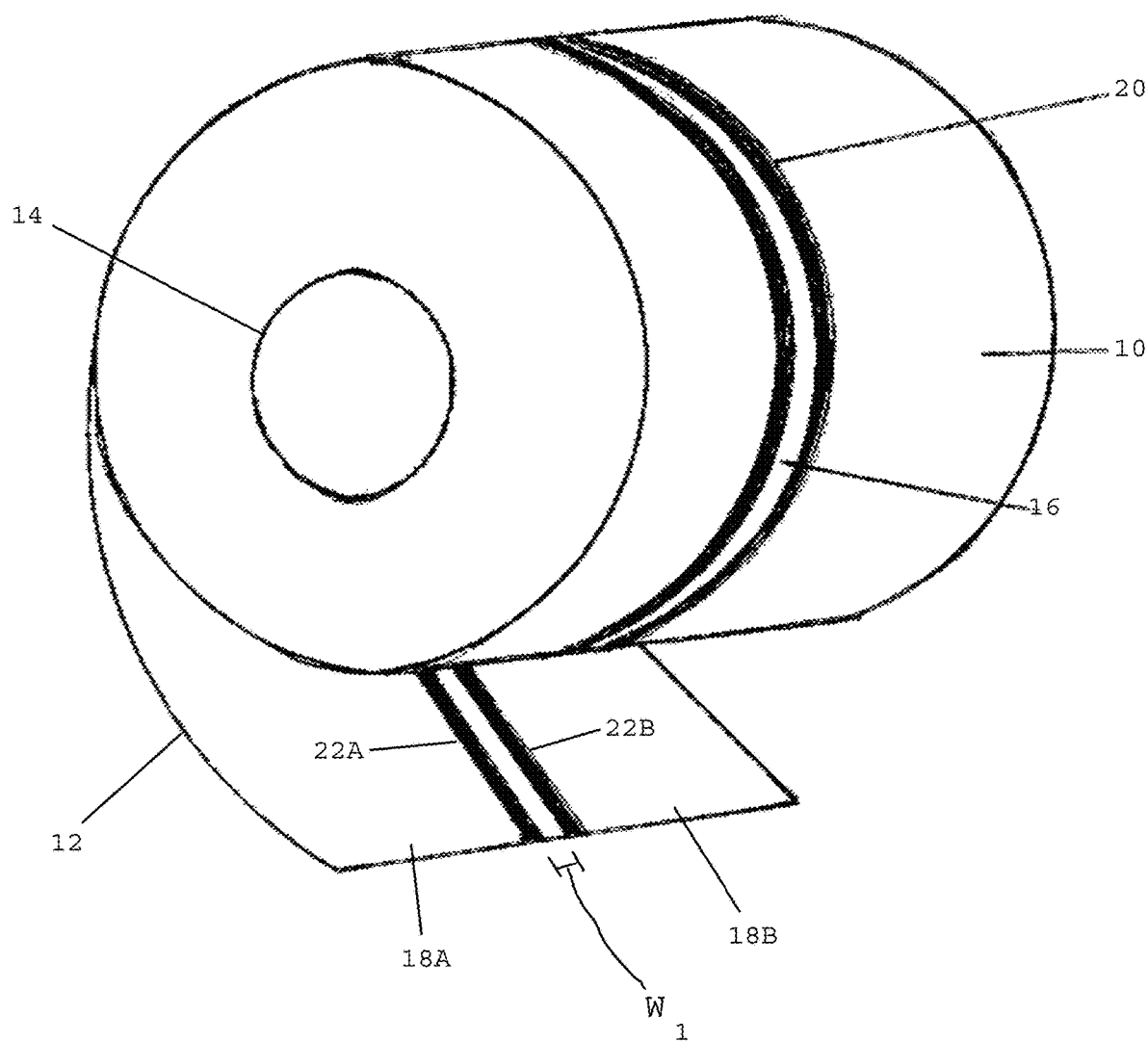
FIG. 1 shows a perspective view of a paper product including a paper roll having individual sheets with moist center sections and dry outer sections, in accordance with one embodiment of the present invention.

Referring to FIG. 1, in one embodiment, a paper roll 10, such as a roll of toilet tissue, preferably includes a plurality of individual sheets 12 that are wound about a core 14, such as a cardboard roll. The individual sheets 12 may be connected to one another along perforated lines (not shown) that enable the individual sheets to be separated from one another. The paper roll 10 preferably has a moist center section 16 that is bounded by two dry outer sections 18A, 18B. The moist center section 16 is preferably treated with a liquid solution such as a moisturizer, cleaning solution, antiseptic, medicated solution, etc. In one embodiment, the moist center section 16 is treated with a liquid solution similar to that used for baby wipes and/or cleaning wipes.

In one embodiment, the center section 16 is preferably separated from the dry outer sections 18A, 18B by a moisture impermeable barrier 20 that extends continuously along the length of the paper roll 10. The moisture impermeable barrier preferably extends along the length of each of the individual sheets 12, whereby the center section 16 of each sheet are aligned with one another, the dry outer sections 18A, 18B of each sheet are aligned with one another, and the moisture impermeable barrier 20 of each sheet are aligned with one another. In one embodiment, the moisture impermeable barrier 20 preferably includes a first barrier row 22A and a second barrier row 22B. The first and second barrier rows 22A, 22B preferably define a width $W_1$ of the moist center section 16. In one embodiment, the moist center section 16 has a width $W_1$ of about 4-20 mm and more preferably about 6-8 mm.

In one embodiment, when the paper roll 10 is being stored and is not in use, the barrier 20 is preferably made of a material that retains the moisture and/or the liquid within the moistened center section 16 so that the moisture and/or liquid therein does not evaporate. In one embodiment, the barrier 20 is made of a wax material that provides a moisture impermeable barrier between the moist center section 16 and the dry outer sections 18A, 18B. The wax material preferably permeates every layer of the paper roll 10 to create a seal from one sheet 12 to the next sheet. In one embodiment, when the paper is needed, a user may pull on the free end of the paper roll 10 to break the wax seal and separate the layers of paper for exposing the moistened center sections 16 of the sheets. In one embodiment, the moisture impermeable barrier 20 may include nano particles that are used instead of or in combination with the wax in order to separate the moist center section from the dry sections of the sheets. The nano material preferably blocks the moisture from permeating into the dry sections of the sheets. In one embodiment, the moist center sections 16 are used for applying the wet cleaning solution in order to clean surfaces using moisture/wetness. The dry outer sections 18A, 18B are preferably used for drying the surfaces that have been cleaned by the moist center sections.

In one embodiment, the moisture impermeable barrier 20 preferably includes two rows 22A, 22B of barrier material placed in the center of the paper sheets 12. In one embodiment, the barrier rows 22A, 22B are made of wax, such as wax gelate. In one embodiment, the wax barrier is preferably placed on the paper during the final stages of manufacturing such as when the paper is being rolled up on a core for accurately positioning and placing the wax barrier. In one embodiment, the wax barrier preferably serves as a moisture impermeable barrier that traps the moisture or liquid solution within the center section 16. In one embodiment, the paper is preferably rolled around a core in order to hold the liquid solution or moist solution within the center sections 16 of the sheets of the paper roll.

In one embodiment, the wax barrier is preferably delicate in texture and non-abrasive. The wax barrier is desirably well contained so that it does not smear during use. As such, it is preferable that the wax material does not end up on a user when applied to the user's skin. In one embodiment, the wax barrier is desirably made of a natural material that is hypoallergenic. The wax barrier may have a color that is similar to the underlying paper substrate.

In one embodiment, the layers of a paper product may be sealed using heat injected material, material that is pressure sprayed onto the paper sheets, or by pressure sealing the layers using various materials including barrier rows made of moisture impermeable materials such as wax.

In one embodiment, after the paper roll 10 has been manufactured, the barrier rows 22A, 22B desirably maintain a moisture impermeable seal while the product is not being used. In one embodiment, the barrier rows 22A, 22B are preferably capable of enabling a user to easily unravel the paper roll when tugging at the paper sheets. In one embodiment, it is relatively easy for a user to break the seal formed by the barrier material when unrolling the paper product.

In one embodiment, the barrier rows 22A, 22B are preferably capable of handling excessive heat during shipment. The barrier material, such as a wax gelate, is preferably a natural, biodegradable material. In one embodiment, the moist center sections 16 of the sheets of the paper product may be modified to improve the moisture-holding properties of the sheets. In one embodiment, the center sections 16 of the paper sheets have the same density and/or properties as the dry outer sections 18A, 18B of the paper sheets so as to avoid the formation of a paper roll having a swelled center section.

Referring to FIG. 2A, in one embodiment, a paper roll 110 preferably includes individual paper sheets 112A, 112B that are connected together along a perforated line 115 that enables the individual sheets to be separated from one another. In FIG. 2A, only two sheets are shown, however, a plurality of sheets may be wound in a paper roll as shown in FIG. 1. In one embodiment, each individual paper sheet 112A preferably includes a moistened center section 116 bounded by dry outer sections 118A, 118B. The moist center section 116 is preferably moistened by a liquid such as a moisturizer, a cleaning solution, and/or liquid solutions used in baby wipes. The moistened center section 116 is preferably separated from the dry outer sections 118A, 118B by a moisture impermeable barrier such as a first row 122A of a moisture impermeable material and a second row 122B of a moisture impermeable material. In one embodiment, the rows of the moisture impermeable material 122A, 122B preferably extend along the entire length of the paper roll 110 for retaining the moisture/wetness of the center sections 116, and preventing the moisture from seeping into the dry outer sections 118A, 118B.

In the embodiment shown in FIG. 2A, the first and second moisture impermeable rows 122A, 122B are further apart from one another than are the moisture impermeable rows shown in the embodiment of FIG. 1. In one embodiment, the moist center section 116 has a width $W_2$ of about 10-100 mm, and more preferably about 50 mm. As a result, the dry outer sections 118A, 118B are narrower than are the dry outer sections 18A, 18B of the paper roll in the embodiment shown in FIG. 1.

Figure 2B:
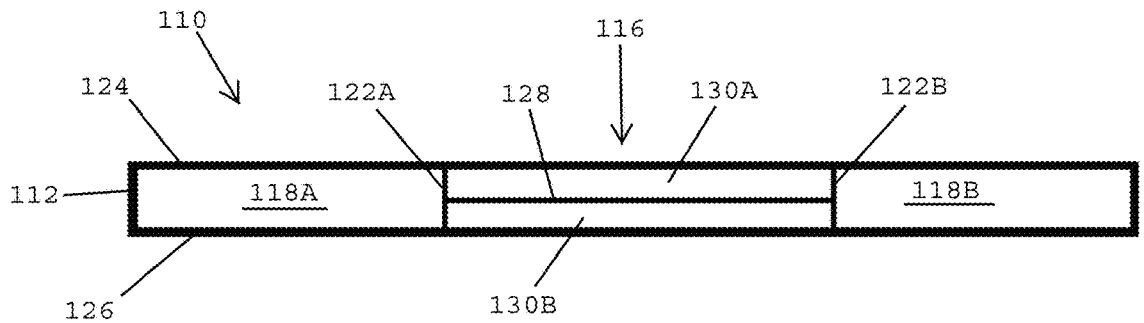
FIG. 2B shows a cross-sectional view of the paper product shown in FIG. 2A taken along line 2B-2B in FIG. 2A.

Referring to FIG. 2B, in one embodiment, the paper roll 110 preferably includes a plurality of individual paper sheets 112, each sheet having a moistened center section 116 bounded by dry outer sections 118A, 118B. The moistened center section 116 is separated from the respective dry outer sections 118A, 118B by a first row 122A of a moisture impermeable material and a second row 122B of a moisture impermeable material. The paper sheet 112B has a top surface 124 and a bottom surface 126. The paper sheet 112B preferably includes a water resistant membrane 128 that extends laterally between the first row 122A of the moisture impermeable material and the second row 122B of the moisture impermeable material. The water resistant membrane 128 divides the moistened center section 116 into a first or upper moistened center section region 130A, which extends between the water resistant membrane 128 and the top surface 124 of the paper sheet 112B, and a second or lower moistened center section region 130B, which extends between the water resistant membrane 128 and the bottom surface 126 of the paper sheet 112B.

In one embodiment, the moist center section 116 is made up of three layers including the water resistant membrane 128, which divides the first region 130A of the moist center section 116 from the second region 130B of the moist center section 116. The water resistant membrane 128 preferably acts as a thin, water resistant barrier that stops moisture from evaporating or seeping into sheets 112 that are exposed to ambient air. The thin moisture resistant membrane 128 may be made of numerous biodegradable materials that are both natural and synthetic. Materials may include natural soy material, albumin protein film such as the type found between a hard-boiled egg and the outer shell.

Although the present invention is not limited by any particular theory of operation, it is believed that providing a moist center section 116 having three layers will maximize moisture and/or liquid retention within the moist center section 116 of each sheet 112 by minimizing exposure of the moisture/liquid to air. Providing sheets 112 with a water resistant membrane 128 located between the first and second regions 130A, 130B of each moist center section desirably prevents moisture from evaporating and/or seeping to the outside of the paper product, where exposure to air could dry out the layers over time.

Figure 2C:
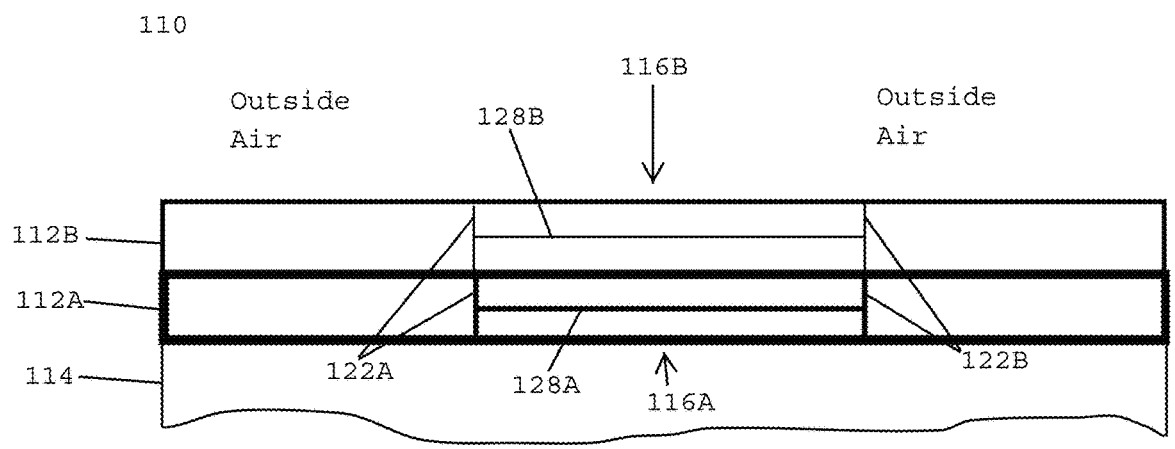
FIG. 2C shows two consecutive layers of the paper product shown in FIGS. 2A and 2B.

Referring to FIG. 2C, in one embodiment, a paper product 110 includes a first layer 112A, and a second layer 112B wound around a core element 114, such as a cardboard roll. Additional layers 112 may be wound around the core element 114, however, only two layers 112A, 112B are shown in FIG. 2C for simplicity. The second layer 112B is a top layer of the paper product 110 that is exposed to outside air. The water resistant membranes 128A, 128B extend laterally across the respective moist center sections 116A, 1168, between the first and second rows 112A, 122B of moisture impermeable material, to prevent the moisture and/or liquid within the respective moist center sections 116 from evaporating and/or escaping from the moist center sections.

Figure 3:
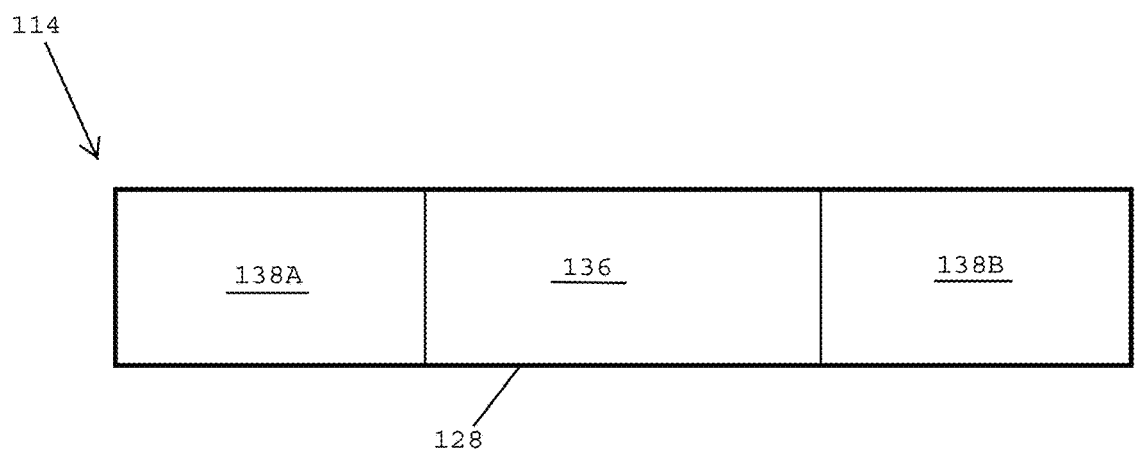
FIG. 3 shows a front elevation view of the paper roll shown in FIG. 1, in accordance with one embodiment of the present invention.

Referring to FIG. 3, in one embodiment, the core element 114 may be made of paper or cardboard, such as a cardboard roll, and may have a first outer section 138A, a second outer section 138B, and a center section 136. The outer sections 138A, 138B are designed to receive the dry outer sections 118A, 118B of the paper sheets, and the center section 136 is designed to receive the moist center sections 116 of the paper sheets. In one embodiment, before the paper sheets are wound around the core element 114, the center section 136 of the core element 114 is preferably coated or sprayed with a moisture impermeable material such as wax, nano particles, or a water resistant membrane to prevent the moisture in the lower layers of the individual sheets from seeping into the core element 114 for evaporating/escaping outside the product, which could result in drying out the layers over time.

In one embodiment, the various components of the paper product may be joined together using heat sealing, pressure, and/or other methods. In one embodiment, the dry sections of the sheets are made separately from the moist sections of the sheets and the components are joined together when the materials are ready to be rolled onto the core element such as a cardboard roll.

Referring to FIG. 4A, in one embodiment, a paper roll 210 preferably includes individual paper sheets 212A, 212B that are connected together along perforated lines 215. The perforated lines 215 enable the individual sheets 212A, 212B to be separated from one another. In FIG. 4A, only two sheets are shown, however, a plurality of sheets may be wound around a paper roll as shown in FIG. 1. In one embodiment, each individual sheet 212A, 212B preferably includes a moist section 216 and a dry section 218. The moist section 216 is preferably treated by a liquid solution and the moisture of the liquid solution is retained in the moist section 216. In one embodiment, the moist section 216 is separated from the dry section 218 by a first row 222A of a moisture impermeable material that extends along the length of the paper roll 210. The moistened center section 216 also preferably includes a second row 222B of a moisture impermeable material that extends along an outer edge of the paper roll 210. The moisture impermeable rows 222A, 222B preferably form a seal for holding the moisture within the moist sections 216 of the paper sheets when the sheets are rolled about a core (not shown). The row 222B preferably prevents the moisture from seeping into the dry section 218 of the paper product.

In one embodiment, the moist sections 216 have a width that is substantially similar to the width of the dry sections 218. In one embodiment, the moist section may be wider than the dry section associated therewith. In one embodiment, the moist section may be narrower than the dry section associated therewith.

Referring to FIG. 4B, the each paper sheet 212A, 212B preferably includes a water resistant membrane 228 that extends laterally between the first row 222A of the moisture impermeable material and the second row 222B of the moisture impermeable material. The water resistant membrane 228 divides the moist section 216 into a first or upper moistened center section region 230A, which extends between the water resistant membrane 228 and a top surface 224 of the paper sheet 212B, and a second or lower moistened center section region 230B, which extends between the water resistant membrane 228 and a bottom surface 226 of the paper sheet 212B.

In one embodiment, the moist section 216 is made up of three layers including the water resistant membrane 228, which divides the first region 230A of the moist section 216 from the second region 230B of the moist section 216. The water resistant membrane 228 preferably acts as a thin, water resistant barrier that stops moisture from evaporating or seeping into sheets 212 that are exposed to ambient air. The thin moisture resistant membrane 228 may be made of numerous biodegradable materials that are both natural and synthetic. Materials may include natural soy material, albumin protein film such as the type found between a hard-boiled egg and the outer shell.

Figure 5A:
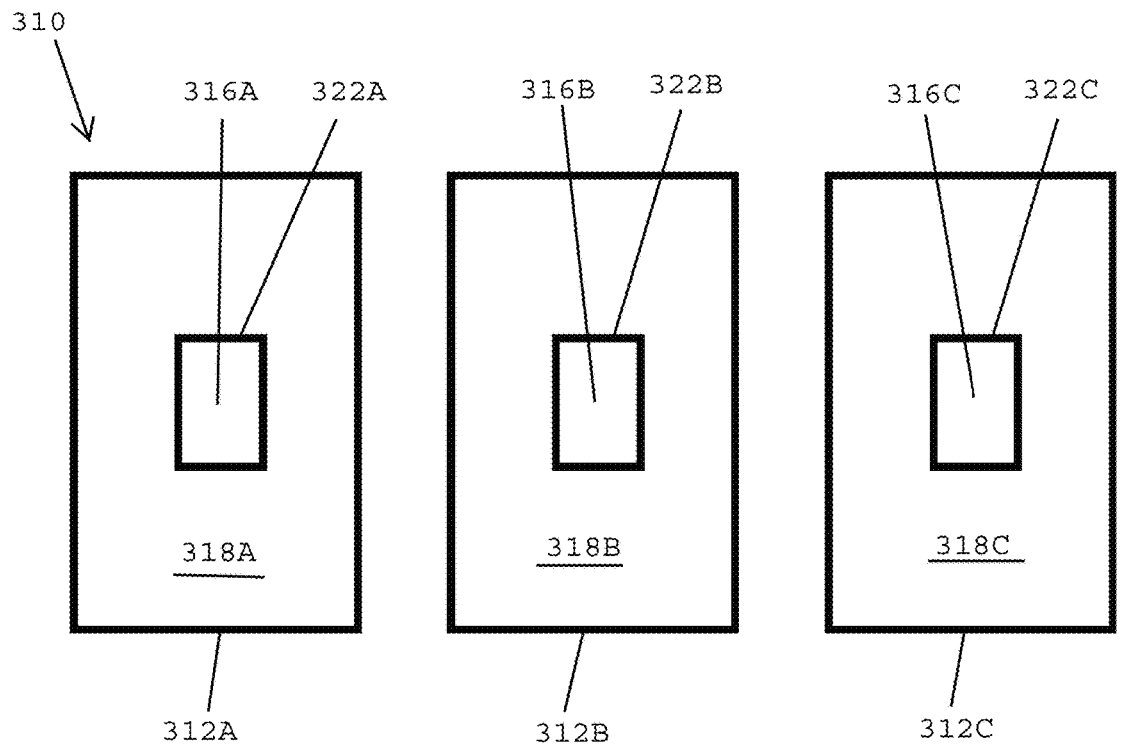
FIG. 5A shows a top plan view of a paper product having stackable sheets with each sheet having a moist section, a dry section and a moisture impermeable barrier separating the moist and dry sections, in accordance with one embodiment of the present invention.

Referring to FIG. 5A, in one embodiment, a paper product 310 preferably includes a plurality of individual paper sheets 312A, 312B, 312C that are stackable atop one another. Although only three sheets are shown in FIG. 5A, other embodiments may have more sheets stacked atop one another (e.g., 50, 100, 150, etc.). In one embodiment, each individual paper sheet 312A-312C preferably includes a moistened center section 316A-316O bounded by a dry outer section 318A-318C. The moistened center sections 316A-316C are preferably moistened by a liquid such as a moisturizer, a cleaning solution, and/or liquid solutions used in baby wipes. The moistened center sections 316A-316O are preferably separated from the dry outer sections 318A-318O by moisture impermeable barriers 322A-322C. In one embodiment, the moistened center sections 316A-316C and the moisture impermeable barriers 322A-322C associated therewith may have various geometric shapes including square, circular and oval shapes. In other embodiments, the moistened center sections and moisture impermeable barriers may have other geometric shapes.

Figure 5B:
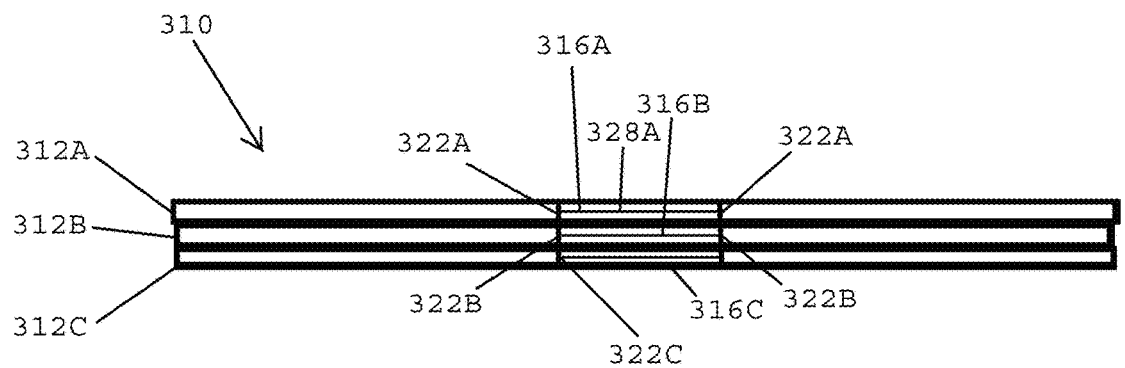
FIG. 5B shows a side view of the paper product of FIG. 5A with the sheets stacked atop one another, in accordance with one embodiment of the present invention.

Referring to FIG. 5B, in one embodiment, the individual sheets 312A-312C are stacked atop one another to form a stacked paper product, with the moistened center sections 316A-316O aligned with one another, which, in turn, aligns the moisture impermeable barriers 322A-322C with one another for sealing the moisture and/or liquid within the center sections of the sheets as long as the individual sheets 312A-312C remain stacked atop one another. In one embodiment, when a top sheet 312A is peeled away from an underlying sheet 312B, the seal between the adjacent moisture impermeable barriers 322A and 322B is broken. In one embodiment, after the top sheet 312A has been peeled away, the second and third sheets 312B, 312C remain connected together via a seal formed by the second and third moisture impermeable barriers 322B, 322C. The seal retains the moisture within the center sections 316B, 316C of the second and third sheets 312B, 312C.

Referring to FIG. 5B, in one embodiment, each sheet 312 has a water impermeable membrane 328 that extends between the top and bottom surfaces of the sheet and between the moisture impermeable barriers 322 to prevent the liquid from evaporating from the moist center sections 316 when the sheets are stacked atop one another.

In one embodiment, the moistened sections of the paper rolls that hold the moisture and/or liquid material are made of a specialized material that is absorbent and that has properties that do not encourage the moisture to leak out. In one embodiment, the paper material used for the moist sections is preferably adapted to maintain moisture as long as the paper roll is stored on a shelf and/or during extended periods of non-use. In one embodiment, the moist sections of the paper rolls are made of paper having a micro-sponge like pattern. In one embodiment, the micro-sponge like pattern has an additional micro layer that preferably helps seal and/or retain the moisture within the center sections.

In one embodiment, any section of a sheet may be isolated using moisture impermeable barrier material to provide at least one moist section of the sheet and at least one dry section of the sheet. In one embodiment, the moist section of a sheet may have a geometric shape such as a square or circular shape that is surrounded by the barrier material for separating the moist section from the dry section.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A paper product comprising:
   a core element;
   a plurality of individual paper sheets wound around said core element to form a paper roll;
   each of said individual paper sheets having a top surface, a bottom surface, a moist center section impregnated with a liquid, a first dry outer section bounding a first edge of said moist center section, a second dry outer section bounding a second edge of said moist center section, a first moisture impermeable barrier at said first edge of said moist center section that divides said moist center section from said first dry outer section, a second moisture impermeable barrier at said second edge of said moist center section that divides said moist center section from said second dry outer section, and a water impermeable membrane extending laterally from said first moisture impermeable barrier to said second moisture impermeable barrier and between said top and bottom surfaces for dividing said moist center section into a first region that extends from said water impermeable membrane to said top surface and a second region that extends from said water impermeable membrane to said bottom surface.

2. The paper product as claimed in claim 1, wherein said first and second moisture impermeable barriers of said plurality of individual sheets extend along a length of said paper roll.

3. The paper product as claimed in claim 1, wherein said first moisture impermeable barrier and said second moisture impermeable barrier define a width of said moist center section.

4. The paper product as claimed in claim 3, wherein said water impermeable membrane extends from said first moisture impermeable barrier to said second moisture impermeable barrier and between said top and bottom surfaces.

5. The paper product as claimed in claim 1, wherein said core element comprises a cardboard roll.

6. The paper product as claimed in claim 5, wherein said cardboard roll has a center section that is covered by a third moisture impermeable barrier.

7. The paper product as claimed in claim 1, wherein said first moisture impermeable barrier and said second moisture impermeable barrier comprise materials selected from the group consisting of wax and nano particles and said water impermeable membrane extending through said paper sheet comprises materials selected from the group consisting of natural biodegradable materials, synthetic biodegradable materials, soy, and albumin protein films.

8. The paper product as claimed in claim 1, wherein said liquid contained within said moist center section is selected from the group consisting of liquid solutions, moisturizers, cleaning solutions, antiseptics, medicated solutions, alcohol, liquid soap, baby wipes solutions and cleaning wipes solution.

9. The paper product as claimed in claim 1, wherein said moist center sections of each of said individual paper sheets are aligned with one another on said core element.

10. A paper product comprising:
a core element;
a plurality of individual paper sheets wound around said core element to form a paper roll;
each of said individual paper sheets having a top surface, a bottom surface, a first edge, a second edge, a moist section impregnated with a liquid, a dry section bounding said first edge of said moist section, a first moisture impermeable barrier at said first edge of said moist section that divides said moist section from said dry section, a second moisture impermeable barrier at said second edge of said moist section, and a water impermeable membrane extending laterally from said first moisture impermeable barrier to said second moisture impermeable barrier and between said top and bottom surfaces for dividing said moist section of into a first region that extends from said water impermeable membrane to said top surface of said paper sheet and a second region that extends from said water impermeable membrane to said bottom surface, wherein said first and second moisture impermeable barriers extend along a length of said paper roll wound around said core element.

11. The paper product as claimed in claim 10, wherein said first moisture impermeable barrier and said second moisture impermeable barrier barriers define a width of said moist section.

12. The paper product as claimed in claim 11, wherein said water impermeable membrane extends from said first moisture impermeable barrier to said second moisture impermeable barrier and between said top and bottom surfaces.

13. The paper product as claimed in claim 12, wherein said core element comprises a cardboard roll having a first section that is aligned with said moist section, and a second section that is aligned with said dry section, and wherein said first section of said cardboard roll is covered by a third moisture impermeable barrier.

14. The paper product as claimed in claim 10, wherein said first moisture impermeable barrier and said second moisture impermeable barrier comprise materials selected from the group consisting of wax and nano particles and said water impermeable membrane comprises materials selected from the group consisting of natural biodegradable materials, synthetic biodegradable materials, soy, and albumin protein films.

15. The paper product as claimed in claim 10, wherein said liquid contained within said moist section is selected from the group consisting of liquid solutions, moisturizers, cleaning solutions, antiseptics, medicated solutions, alcohol, liquid soap, baby wipes solutions and cleaning wipes solution.

16. The paper product as claimed in claim 10, wherein said moist sections of each of said individual paper sheets are aligned with one another on said core element.

17. A paper product comprising:
a cardboard roll having a center section and two outer sections, wherein said center section is covered by a moisture impermeable barrier;
a plurality of individual paper sheets wound around said cardboard roll to provide a paper roll;
each said individual paper sheet having a top surface, a bottom surface, a moist center section impregnated with a liquid, a first dry outer section bounding a first edge of said moist center section, a second dry outer section bounding a second edge of said moist center section, a first moisture impermeable barrier at said first edge of said moist center section that divides said moist center section from said first dry outer section, a second moisture impermeable barrier at said second edge of said moist center section that divides said moist center section from said second dry outer section, and a water impermeable membrane extending laterally from said first moisture impermeable barrier to said second moisture impermeable barrier and between said top and bottom surfaces of said individual paper sheet for dividing said moist center section into a first region that extends from said water impermeable membrane to said top surface of said individual paper sheet and a second region that extends from said water impermeable membrane to said bottom surface of said individual paper sheet, wherein said center section of said cardboard roll is aligned with said moist center sections of said paper sheets wound around said cardboard roll, and said first and second outer sections of said cardboard roll are aligned with said first and second dry outer sections of said paper sheets wound around said cardboard roll, and wherein said moisture impermeable material coating said center section of said cardboard roll prevents the moisture in said moist center sections of said individual papers sheets from seeping into said cardboard roll.

18. The paper product as claimed in claim 17, wherein said water impermeable membrane of said outer-most paper sheet wound around said cardboard roll prevents the liquid contained in said moist center sections from evaporating into the ambient air surrounding said paper product.

19. The paper product as claimed in claim 18, wherein said moisture impermeable barrier on said cardboard roll prevents said liquid contained in said moist center sections from evaporating into the ambient air through said cardboard roll.

20. The paper product as claimed in claim 17, wherein said first and second moisture impermeable barriers extend continuously over each of said individual paper sheets wound around said cardboard roll and along an entire length of said paper roll.

\* \* \* \* \*